US012739901B2

(12) United States Patent
Zhang et al.

(10) Patent No.: US 12,739,901 B2
(45) Date of Patent: Sep. 15, 2026

(54) UE BASED PAIR ID FOR REDUNDANT PDU SESSIONS

(71) Applicant: QUALCOMM Incorporated, San Diego, CA (US)

(72) Inventors: Juan Zhang, Beijing (CN); Haris Zisimopoulos, London (GB)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 17/757,142

(22) PCT Filed: Dec. 10, 2019

(86) PCT No.: PCT/CN2019/124194
§ 371 (c)(1),
(2) Date: Jun. 9, 2022

(87) PCT Pub. No.: WO2021/114066
PCT Pub. Date: Jun. 17, 2021

(65) Prior Publication Data

US 2023/0156831 A1 May 18, 2023

(51) Int. Cl.
*H04W 76/11* (2018.01)
*H04W 76/12* (2018.01)

(52) U.S. Cl.
CPC ............ *H04W 76/11* (2018.02); *H04W 76/12* (2018.02)

(58) Field of Classification Search
CPC ..... H04W 76/11; H04W 76/12; H04W 76/22; H04W 76/32; H04W 88/02; H04W 88/08; H04W 88/18
See application file for complete search history.

(56) References Cited

U.S. PATENT DOCUMENTS

2016/0212030 A1 7/2016 Racz et al.
2019/0364607 A1 11/2019 Lai et al.
2021/0250788 A1* 8/2021 Kim ...................... H04W 24/04

FOREIGN PATENT DOCUMENTS

CN 110475381 A 11/2019
CN 110536332 A 12/2019
(Continued)

OTHER PUBLICATIONS

NEC: "URLLC KI-1 Solution 1—Updates Related to the URLLC Support by the Network", SA WG2 Meeting #130, S2-1900342, Jan. 21, 2019-Jan. 25, 2019, Kochi, India, Jan. 15, 2019, 6 Pages, Section 6.1.

(Continued)

*Primary Examiner* — Justin T Van Roie
(74) *Attorney, Agent, or Firm* — NORTON ROSE FULBRIGHT US LLP

(57) ABSTRACT

In one aspect, a method includes determining, by a user equipment (UE), a pair identifier (ID); and transmitting, by the UE, a protocol data unit (PDU) session establishment message and the pair ID. In another aspect, a method include receiving, by a first network entity from a second network entity, a PDU session request message including a pair ID; and associating, by the network entity, a PDU session indicated by the PDU session request message with the pair ID. In yet another aspect, a method includes receiving, by a network entity from a UE, a PDU session establishment message and a pair ID; and transmitting, by the network entity, a PDU session request message responsive to the PDU session establishment message and including the pair ID.

30 Claims, 11 Drawing Sheets

(56) References Cited

FOREIGN PATENT DOCUMENTS

| | | | |
|---|---|---|---|
| KR | 10-2019-0123065 | * | 10/2019 |
| WO | WO-2019130048 A1 | | 7/2019 |

OTHER PUBLICATIONS

Ericsson: "Evaluation of Solution# 1: Redundant User Plane Paths Based on Dual Connectivity", 3GPP TSG-SA WG2 Meeting #129, S2-1810109 Oct. 19, 2018 (Oct. 19, 2018), 8 pages, section 6.1.

International Search Report and Written Opinion—PCT/CN2019/124194—ISA/EPO—Aug. 27, 2020.

NEC: "URLLC KI-1 Solution 1—Updates Related to the URLLC Support by the Network", SA WG2 Meeting #130, S2-1900342, Jan. 25, 2019 (Jan. 25, 2019), 6 pages, section 6.1.1.

LG Electronics: "Clarification on PDU Session Pair Information to NG-RAN", 3GPP TSG-SA2 Meeting #136, S2-1911235, 3rd Generation Partnership Project, Mobile Competence Centre, 650, Route Des Lucioles, F-06921 Sophia-Antipolis Cedex, France, vol. SA WG2, No. Reno, NV, USA, Nov. 18, 2019-Nov. 22, 2019, Nov. 7, 2019, pp. 1-5, XP051816363, Para 4.2.3.2, Para 4.3.2.2.1.

LG Electronics: "Discussion on PDU Session Pair Information Between Two SMFs", 3GPP TSG-SA2 Meeting #135, S2-1909850, 3rd Generation Partnership Project, Mobile Competence Centre, 650, Route Des Lucioles, F-06921 Sophia-Antipolis Cedex, France, vol. SA HG2, No. Split, Croatia, Oct. 14, 2019-Oct. 18, 2019, Oct. 4, 2019, pp. 1-3, XP051795928, Para 1, Figure 1.

Supplementary European Search Report—EP19955591—Search Authority—Berlin—Aug. 3, 2023.

NEC: "URLLC KI-1 Solution 1—Updates Related to the URLLC Support by the Network", SA WG2 Meeting #130, S2-1900342, Jan. 21, 2019-Jan. 25, 2019, Kochi, India, Jan. 15, 2019, 6 Pages.

* cited by examiner

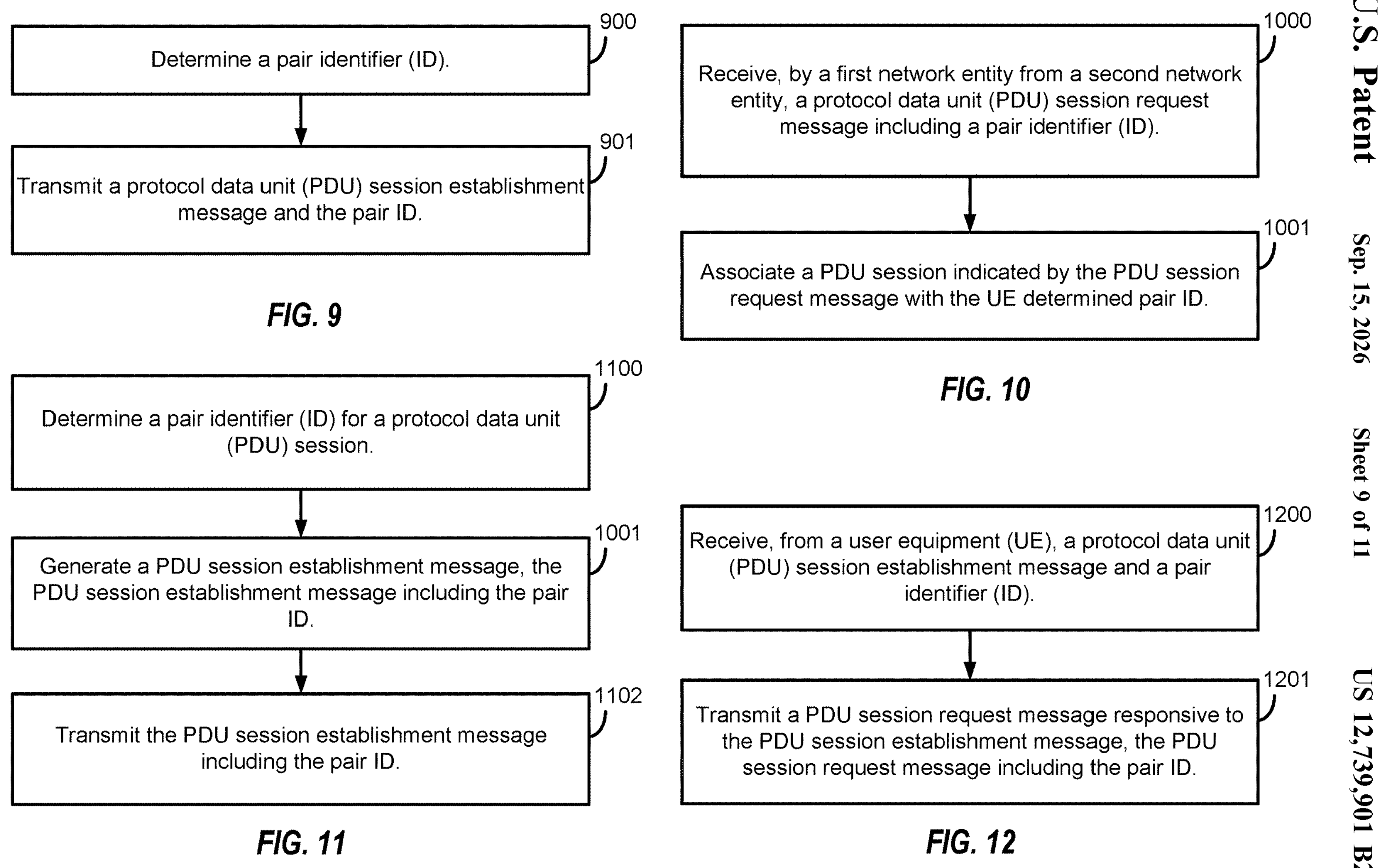
900
Determine a pair identifier (ID).
901
Transmit a protocol data unit (PDU) session establishment message and the pair ID.
FIG. 9
1000
Receive, by a first network entity from a second network entity, a protocol data unit (PDU) session request message including a pair identifier (ID).
1001
Associate a PDU session indicated by the PDU session request message with the UE determined pair ID.
FIG. 10
1100
Determine a pair identifier (ID) for a protocol data unit (PDU) session.
1001
Generate a PDU session establishment message, the PDU session establishment message including the pair ID.
1102
Transmit the PDU session establishment message including the pair ID.
FIG. 11
1200
Receive, from a user equipment (UE), a protocol data unit (PDU) session establishment message and a pair identifier (ID).
1201
Transmit a PDU session request message responsive to the PDU session establishment message, the PDU session request message including the pair ID.
FIG. 12

UE BASED PAIR ID FOR REDUNDANT PDU SESSIONS

CROSS-REFERENCE TO RELATED APPLICATIONS

This application claims the benefit of International Patent Application No. PCT/CN2019/124194, entitled, "UE BASED PAIR ID FOR REDUNDANT PDU SESSIONS," filed on Dec. 10, 2019, which is expressly incorporated by reference herein in its entirety.

BACKGROUND

Field

Aspects of the present disclosure relate generally to wireless communication systems, and more particularly, to redundant PDU session operation.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple user by sharing the available network resources. One example of such a network is the Universal Terrestrial Radio Access Network (UTRAN). The UTRAN is the radio access network (RAN) defined as a part of the Universal Mobile Telecommunication System (UMTS), a third generation (3G) mobile phone technology supported by the 3rd Generation Partnership Project (3GPP). Examples of multiple-access network formats include Code Division Multiple Access (CDMA) networks. Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE, and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method includes determining, by a user equipment (UE), a pair identifier (ID); and transmitting, by the UE, a protocol data unit (PDU) session establishment message and the pair ID.

In an additional aspect of the disclosure, an apparatus configured for wireless communication is disclosed. The apparatus includes means for determining, by a user equipment (UE), a pair identifier (ID); and means for transmitting, by the UE, a protocol data unit (PDU) session establishment message and the pair ID.

In an additional aspect of the disclosure, a non-transitory computer-readable medium having program code recorded thereon. The program code further includes code to determine, by a user equipment (UE), a pair identifier (ID); and to transmit, by the UE, a protocol data unit (PDU) session establishment message and the pair ID.

In an additional aspect of the disclosure, an apparatus configured for wireless communication is disclosed. The apparatus includes at least one processor, and a memory coupled to the processor. The processor is configured to determine, by a user equipment (UE), a pair identifier (ID); and to transmit, by the UE, a protocol data unit (PDU) session establishment message and the pair ID.

In another aspect of the disclosure, a method includes receiving, by a first network entity from a second network entity, a protocol data unit (PDU) session request message including a pair identifier (ID); and associating, by the network entity, a PDU session indicated by the PDU session request message with the pair ID.

In an additional aspect of the disclosure, an apparatus configured for wireless communication is disclosed. The apparatus includes means for receiving, by a first network entity from a second network entity, a protocol data unit (PDU) session request message including a pair identifier (ID); and means for associating, by the network entity, a PDU session indicated by the PDU session request message with the pair ID.

In an additional aspect of the disclosure, a non-transitory computer-readable medium having program code recorded thereon. The program code further includes code to receive, by a first network entity from a second network entity, a protocol data unit (PDU) session request message including a pair identifier (ID); and to associate, by the network entity, a PDU session indicated by the PDU session request message with the pair ID.

In an additional aspect of the disclosure, an apparatus configured for wireless communication is disclosed. The apparatus includes at least one processor, and a memory coupled to the processor. The processor is configured to receive, by a first network entity from a second network entity, a protocol data unit (PDU) session request message including a pair identifier (ID); and to associate, by the network entity, a PDU session indicated by the PDU session request message with the pair ID.

In another aspect of the disclosure, a method includes receiving, by a network entity from a user equipment (UE), a protocol data unit (PDU) session establishment message, the PDU session establishment message including a pair identifier (ID) determined by the UE; and transmitting, by the network entity, a PDU session request message responsive to the PDU session establishment message, the PDU session request message including the UE determine pair ID.

In an additional aspect of the disclosure, an apparatus configured for wireless communication is disclosed. The apparatus includes means for receiving, by a network entity from a user equipment (UE), a protocol data unit (PDU) session establishment message, the PDU session establishment message including a pair identifier (ID) determined by the UE; and means for transmitting, by the network entity, a PDU session request message responsive to the PDU session establishment message, the PDU session request message including the UE determined pair ID.

In an additional aspect of the disclosure, a non-transitory computer-readable medium having program code recorded thereon. The program code further includes code to receive, by a network entity from a user equipment (UE), a protocol data unit (PDU) session establishment message, the PDU session establishment message including a pair identifier (ID) determined by the UE; and to transmit, by the network entity, a PDU session request message responsive to the PDU session establishment message, the PDU session request message including the UE determined pair ID.

In an additional aspect of the disclosure, an apparatus configured for wireless communication is disclosed. The apparatus includes at least one processor, and a memory coupled to the processor. The processor is configured to receive, by a network entity from a user equipment (UE), a protocol data unit (PDU) session establishment message, the PDU session establishment message including a pair identifier (ID) determined by the UE; and to transmit, by the network entity, a PDU session request message responsive to the PDU session establishment message, the PDU session request message including the UE determined pair ID.

In another aspect of the disclosure, a method includes determining, by a user equipment (UE), a pair identifier (ID) for a protocol data unit (PDU) session; generating, by the UE, a PDU session establishment message, the PDU session establishment message including the pair ID; and transmitting, by the UE, the PDU session establishment message including the pair ID.

The foregoing has outlined rather broadly the features and technical advantages of example according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 9 is a block diagram illustrating example blocks executed by a UE.

FIG. 10 is a block diagram illustrating example blocks executed by a network entity.

FIG. 11 is a block diagram illustrating another example of executed by a UE.

FIG. 12 is a block diagram illustrating another example of blocks executed by a network entity.

DETAILED DESCRIPTION

Figure 1:
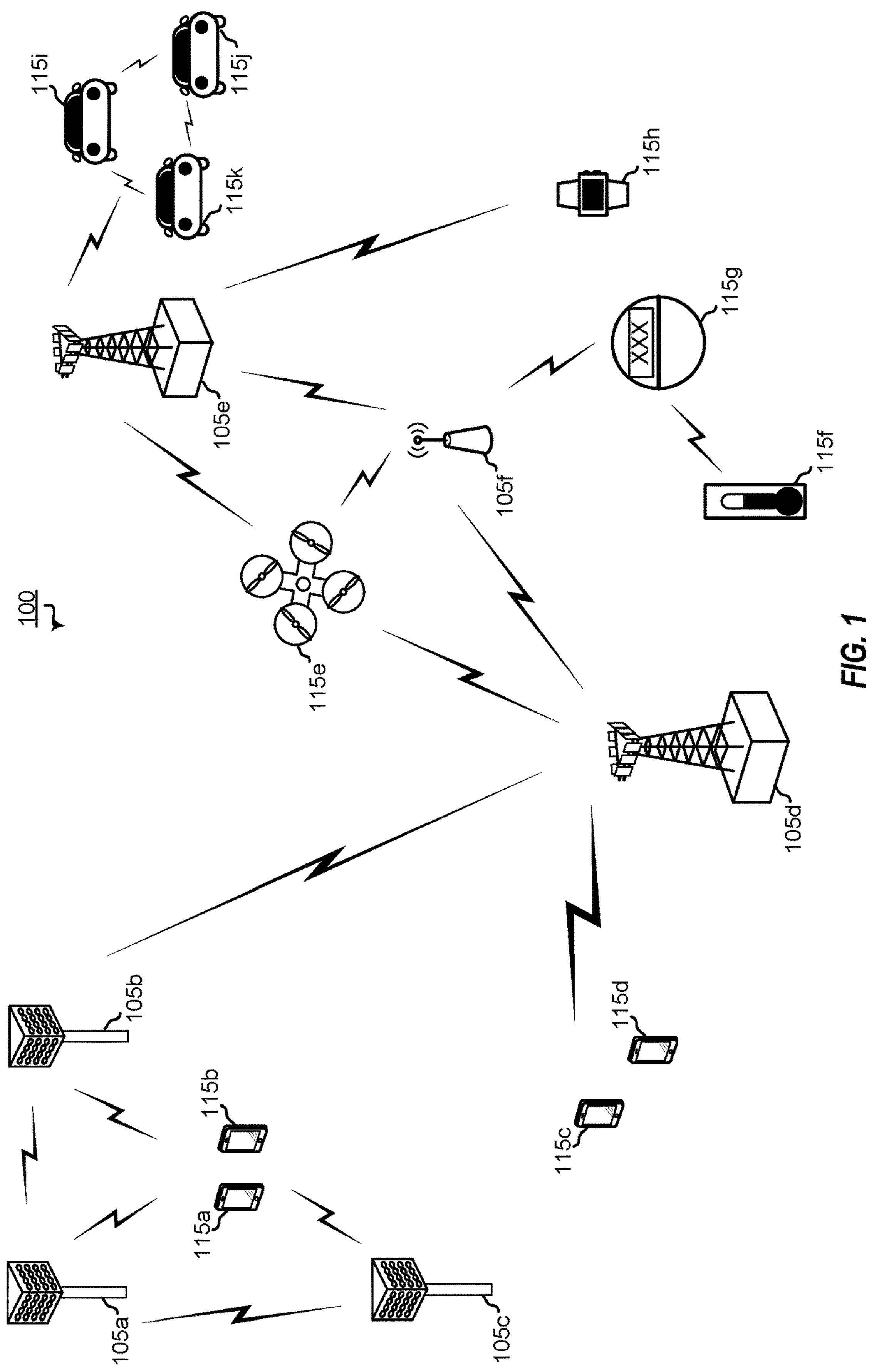
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms “networks” and “systems” may be used interchangeably.

An OFDMA network may implement a radio technology such as evolved UTRA (E-UTRA), IEEE 802.11, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that used E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of sealing to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experiences rates), and deep awareness with advanced discovery and optimizations.

The 5G NR may be implemented to use optimized OFDM-based waveforms with scaleable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementation, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communication in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciated that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

The 5G network 100 may support synchronous or asynchronous operation. For synchronous operation, the base stations may having similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115*a*-115*d* are example of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115*e*-115*k* are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105*a*-105*c* serve UEs 115*a* and 115*b* using 3D beamforming and coordinated spatial techniques, such as coordinated multipoint (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such as UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
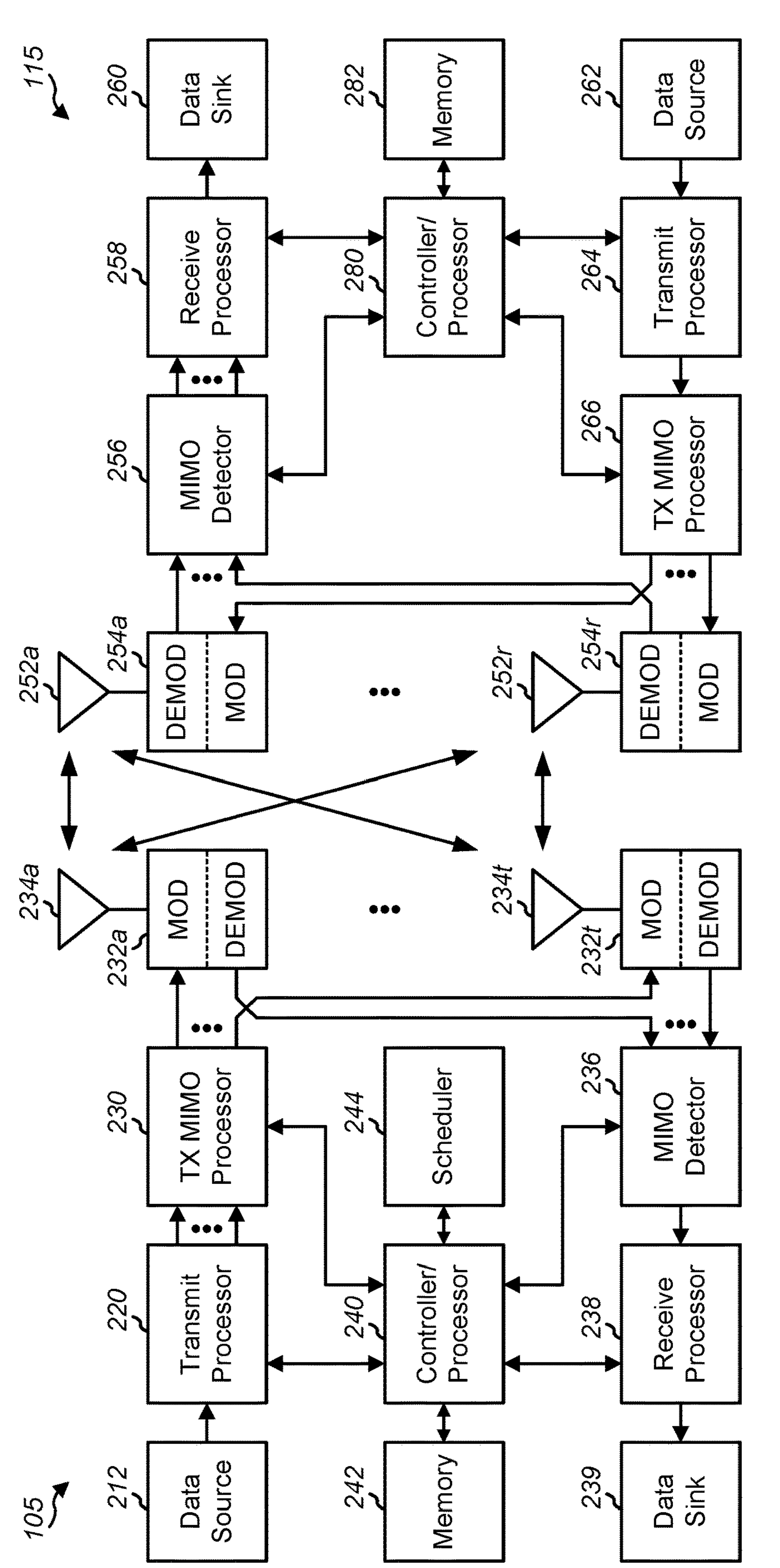
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processors for the techniques described herein. The controllers/processor 280 and/or other processors and modules at the UE 115 may also perform or direct the execution of the functional blocks illustrated in FIGS. 9, 10, 11, or 12, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other times resources where the entity is given priority over other network operating entities to communicate using the share spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 and the 5G network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicated use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermine threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random numbers has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some example, an individual base station 105 or UE 115 may be operated by more than one network operating entity. In other example, each base station 105 and UE 115 may be operated by a single network operating entity. Requiring each base station 105 and UE 115 of different network operating entities to contend for shared resources may result in increased signaling overhead and communication latency.

5G network communication infrastructure is not just confined to mobile voice/text communication, it may be segregated and very diversified to different services like Industrial IoT, Smart home domestic IoT, Low latency Medical communication, high bandwidth mobile broadband, etc. Each of these services may have different data behavior and QoS priorities from network infrastructure.

In 5G, a network node may be equipped with special features to serve the purpose of one or multiple services and the kinds of service supported by a particular node is defined in a NSSF (Network Slice Selection Function). Any particular service request from a UE is served by a set of network entities associated with that service and is called a slice. A network slice is a logical network that may provide specific capabilities and network characteristics.

Each slice is identified by a S-NSSAI (single network slice selection identifier). The S-NSSAI may include a slice/service type (SST) field and a slice differentiator (SD) field. In some implementation, the SD field is optional or may not be used. SST field indicates the behavior of the slice, and the SD differentiator field indicates behavior among multiple slices with same SST value.

A UE during registration and PDU session establishment sends a S-NSSAI value. The requested NSSAI signaled by UE to network allows the network to select appropriate serving access and mobility function (AMF), network slice, and network slice instance. Based on subscription data, on UE can have a subscription to multiple S-NSSAIs and one of them can be marked as default S-NSSAI. Subscription information for each S-NSSAI may have multiple DNN, and one of them may be a default DNN.

In order to support highly reliable and low latency services, such as URLLC services, a UE may set up redundant PDU sessions over an advanced or service based network, such as a 5G network. The redundant PDU sessions provide two different connection paths from a servicing device to a UE to increase reliability and reduce latency. A UE may initiate redundant PDU sessions by providing different combinations of DNN and S-NSSAI for each PDU session of the redundant PDU sessions. In conventional networks, a radio access network (RAN) may be required to receive information to support or enable the redundant PDU sessions. For example, the RAN may use a pair ID to identify PDU sessions for the same service and associate or link the individual PDU sessions of the redundant PDU sessions together for redundant PDU operation. Additionally, the RAN may also be able to flexibly select and transfer control of one or more of the redundant PDU sessions to additional RANs. Without the pair ID, also referred to as a paging ID, the RAN may not be able to initiate or enable redundant PDU sessions.

Currently, there is no specified way for a RAN to determine or receive a pair ID for linking PDU sessions to form redundant PDU sessions. To illustrate, a network cannot make an association for two PDU sessions if the two PDU sessions have or select different session management functions (SMF). Because the UE initiates the PDU session establishment, the UE determined pair ID operations described enable redundant PDU session association and operation. Accordingly, by enabling a redundant PDU session operation, a UE may be able to operate more services in URLLC modes (e.g., in a way that satisfies URLLC constraints) or more often in URLLC modes as compared to using a single PDU session for each service.

Figures 3A, 3B:
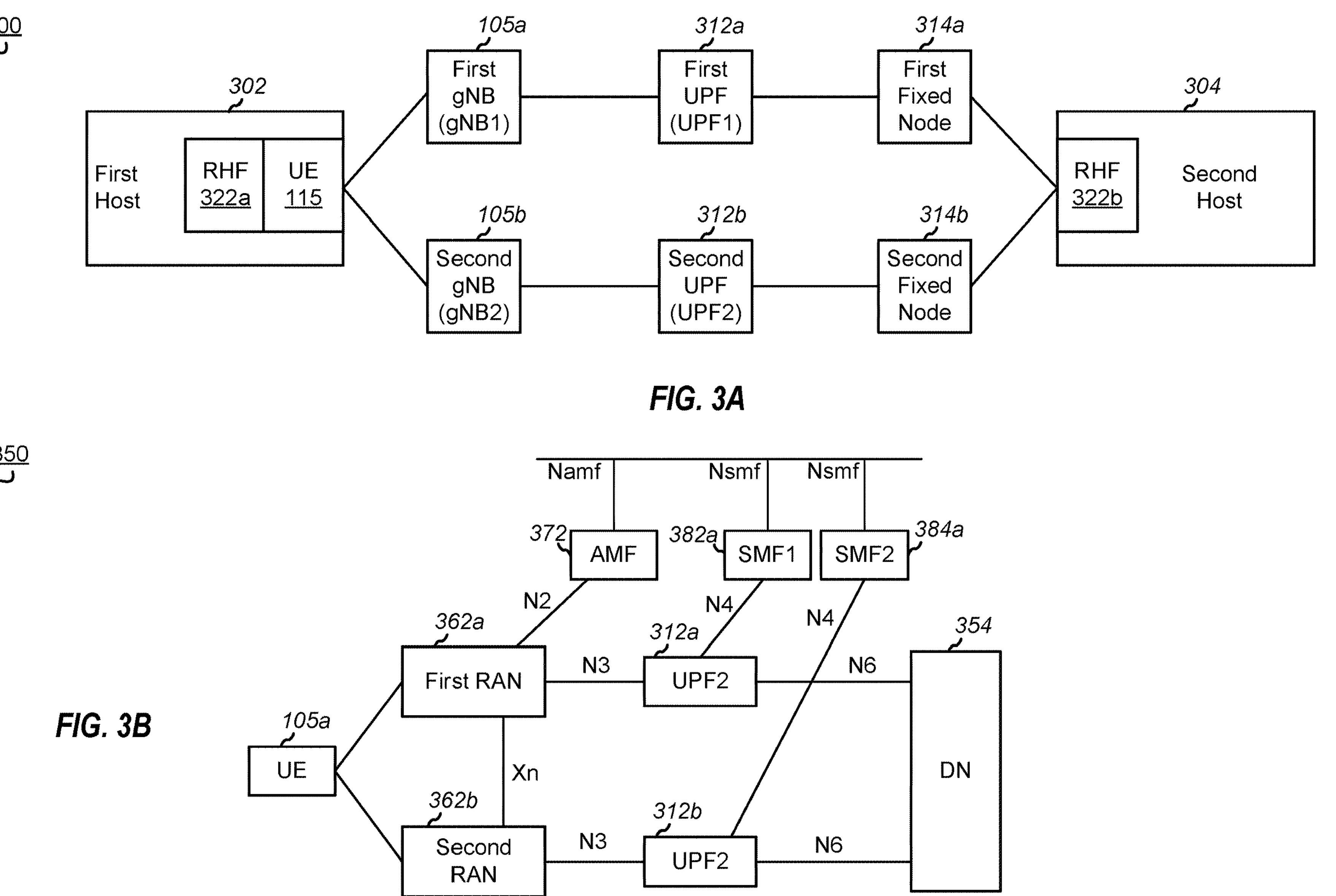
FIGS. 3A and 3B are diagrams illustrating an example of redundant protocol data unit (PDU) session operation.

FIGS. 3A and 3B are diagrams illustrating an example of redundant protocol data unit (PDU) session operation. FIG. 3A is a device diagram 300 illustrating an example of redundant PDU session operation and FIG. 3B is a corresponding service diagram 350. Redundant PDU session operation may enable a service to be provided to a device that satisfies URLLC constraints.

Referring to FIG. 3A, the device diagram 300 includes two host devices, a first host 302 (e.g., Host A) and a second host 304 (e.g., Host B). The host devices 302, 304 are connected via network equipment, such as one or more network entities, to form two separate connection paths. The separate connection paths may be used to form redundant PDU sessions.

5G and other advanced networks or service based networks may virtualize one or more network components. To illustrate, one or more network components, that may have previously been discrete entities in previous generations of wireless networks, may run as software on a particular piece of hardware, device or system. To illustrate, a RAN or RAN operation may be virtualized and included in or be separate from a base station, such as a gNB and transmission reception points (TRPs) thereof.

In the example shown in FIG. 3A, the host devices 302, 304 are each connected to each other via a base station, a user plane function (UPF), and a fixed node. To illustrate, first host 302 is connected to second host 304 via a first gNB 105*a*, a first user plane function 312*a*, and a first fixed node 314*a* for a first connection path, and first host 302 is connected to the second host 304 via a second gNB 105*b*, a second user plane function 312*b*, and a second fixed node 314*b* for a second connection path.

The host device 302 may include or correspond in a terminal device or UE, such us UE 115. Additionally, host devices may include a redundancy handling function (RHF) 322*a*, 322*b*. The RHF 322*a*, 322*b* is a upper layer protocol and is outside of the 3GPP protocol and slack. The RHF 322*a*, 322*b* is used to manage, the replication of packets and elimination of redundant packets over the redundant connection paths.

Although referred to as fixed nodes (314*a*, 314*b*) in the example of FIG. 3A, one or more fixed nodes (314*a*, 314*b*) may be replaced with one or more mobile nodes. In other implementations, additional components or fewer components may be added to one or more connection paths. Although each connection path is unique in the example shown in FIG. 3A, that is no intermediary device or logical element is part of both connection paths, in other implementations, the connection paths may share one or more intermediary devices or logical elements. Additionally, or alternatively, although both connection paths are similar, in other implementations one connection path may include more or less devices than another connection path. Similarly, although two redundant connection paths are shown in FIG 3A, in other implementations the host devices 302, 304 may have additional redundant connection paths.

Referring to FIG. 3B, an example of a corresponding service diagram 350 for the device diagram 300 of FIG. 3A is shown. The service diagram 350 illustrates corresponding services for the device diagram 300 of FIG. 3A. In the example, of FIG. 3B, a UE 115 is connected to a data network 354 via two redundant connection paths. Each connection path includes a RAN and a UPF. Specifically, a first connection path includes a first RAN 362*a* (e.g., a master NG-RAN) and a first UPF 312*a*, and the second connection path includes a second RAN 362*b* (e.g., a secondary NG-RAN) and a second UPF 312*b*.

FIG. 3B further illustrates access and mobility functions (AMFs) and session management functions (SMFs). For example, the first RAN 362*a* (e.g., the master NG-RAN) communicates with the AMF services 372 and the UPF 312*a*, 312*b* each communicate with corresponding SMF services, first SMF 382*a* and second SMF 382*b*. The various connection levels, Xn, N2, N3, N4, N6, etc. between the devices are also illustrated in FIG. 3B.

Systems and methods described herein are directed to redundant PDU session operations and UE based pair ID determination procedures. UE based pair ID determination procedures enable a UE to provide a pair ID for redundant PDU session association and linking by a network entity, such as a RAN. Such operations and procedures may be applicable to enabling URLLC services or having a service satisfy URLLC constraints. The redundant PDU session operations and UE based pair ID determination procedures may enable reduced latency and improved reliability.

Figure 4:
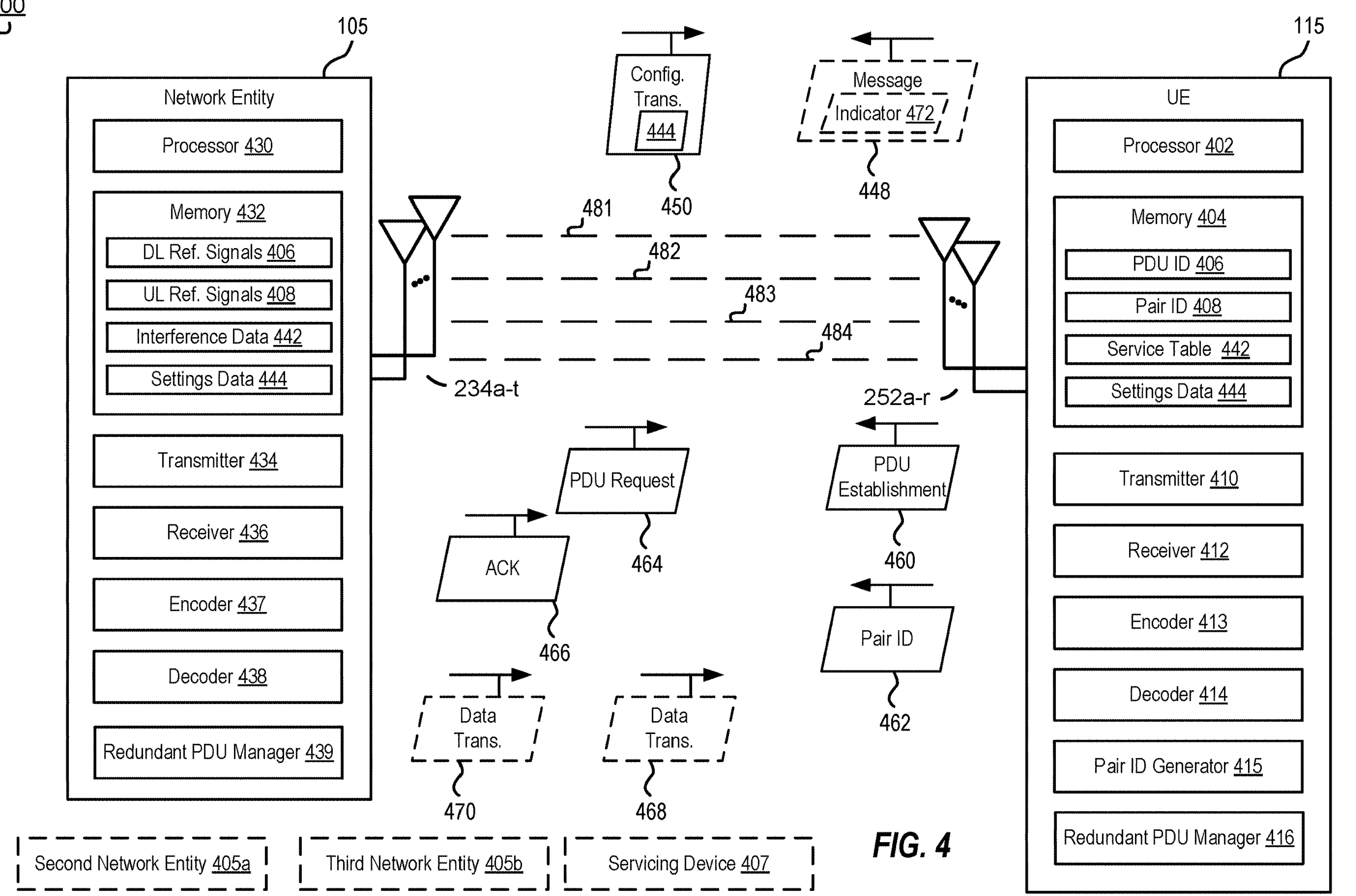
FIG. 4 is a block diagram illustrating an example of a wireless communications system that enables redundant PDU session operation.

FIG. 4 illustrates an example of a wireless communications system 400 that supports UE side determination of pair ID for redundant PDU session operation. In some examples, wireless communications system 400 may implement aspects of wireless communication system 100. For example, wireless communications system 400 includes network entity 105 (such as a network system or SMF) and UE 115, and optionally includes second network entity 405*a* (such as a RAN or base station 105), third network entity 405*b* (such as a second RAN or a second base station 105), a servicing device 407, or a combination thereof. UE based pair ID determination for redundant PDU session operation may enable efficient redundant PDU session operation in advanced and service based networks. Redundant PDU session operation increases reliability and reduces latency as compared to non-redundant PDU session operation.

Network entity 105 and UE 115 may be confirmed to communicate via frequency bands, such as FR1 having a frequency of 410 to 7125 MHz, FR2 having a frequency of 24250 to 52600 MHz for mm-Wave, or bands above FR2. In some implementations, the FR2 frequency bands may be limited to 52.6 GHz. While in some other implementations, the FR2 frequency bands may have a frequency of 300 GHz or more. It is noted that sub-carrier spacing (SCS) may be equal to 15, 30, 60, or 120 kHz for some data channels. Network entity 105 and UE 115 may be configured to communicate via one or more component earners (CCs), such as representative first CC 481, second CC 482, third CC 483, and fourth CC 484. Although four CCs are shown, this is for illustration only, as more or fewer than four CCs may be used. One or more CCs may be used to communicate a Physical Downlink Control Channel (PDCCH), a Physical Downlink Shared Channel (PDSCH), a Physical Uplink Control Channel (PUCCH), or a Physical Uplink Shared Channel (PUSCH).

In some implementations, such transmissions may be scheduled by dynamic grants. In some other implementations, such transmissions may be scheduled by one or more periodic grants and may correspond to semi-persistent scheduling (SPS) grants or configured grants of the one or more periodic grants. The grants, both dynamic and periodic, may be preceded or indicated by a pre-grant transmission or a message with a UE identifier (UE-ID). In some implementations, the pre-grant transmission may include a UE-ID. The pre-grant transmission or UE-ID message may be configured to activate one or more UEs such that the UEs will transmit a first reference signal, listen/monitor for a second reference signal, or both. The pre-grant transmission or UE-ID message may be sent during a contention period, such as contention period 310, and initiate a contention procedure.

Each periodic grant may have a corresponding configuration, such as configuration parameters/settings. The periodic grant configuration may include SPS configurations and settings. Additionally. or alternatively, one or more periodic grants (such as SPS grants thereof) may have or be assigned to a CC ID, such as intended CC ID.

Each CC may have a corresponding configuration, such as configuration parameters/settings. The configuration may include bandwidth, bandwidth part, hybrid automatic repeat request (HARQ) process. TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC also may have corresponding management functionalities, such as, beam management, BWP switching functionality, or both. In some implementations, two or more CCs are quasi co-located, such that the CCs have the same beam or same symbol.

In some implementations, control information may be communicated via network entity 105 and UE 115. For example, the control information may be communicated suing MAC-CE transmissions, RRC transmissions, DCI, transmissions, another transmission, or a combination thereof.

UE 115 includes processor 402, memory 404, transmitter 410, receiver 412, encoder, 413, decoder 414, Pair ID Generator 415, Redundant PDU Manager 416, and antennas 252*a-r*. Processor 402 may be configured to execute instructions stored at memory 404 to perform the operations described herein. In some implementations, processor 402 includes or corresponds to controller/processor 280, and memory 404 includes or corresponds to memory 282. Memory 404 also may be configured to store PDU ID data 406, pair ID data 408, service table data 442, settings data 444, or a combination thereof, as further described herein.

The PDU ID data 406 includes or corresponds to a PDU session ID associated with PDU sessions between the UE 115 and a service provider. To illustrate, PDU ID data 406 may include identifiers or identification data used to signify a particular PDU session. The pair ID data 408 includes or corresponds to an identifier of redundant PDU sessions, a pair ID. The pair ID may also be known as or referred to as a paging ID. A pair ID may be used by a network entity, such as a RAN, to associate PDU sessions together as redundant PDU sessions. The pair ID data 408 may also be associated with particular services. For example, a unique pair ID may be associated with a unique service. The services may include IoT, V2X, remote medical, etc., as illustrative, non-limiting examples.

The service table data 442 includes or corresponds to table associating one or more services (e.g., services data) with PDU ID data 406, pair ID data 408, or both. For example, the service table data 442 may correlate a service ID, service host device ID, or both with one or more PDU IDs and a pair ID. The settings data 444 includes or corresponds to data which is used by UE 115 to determine a redundant PDU session operation mode, a pair ID generation type, or other settings of redundant PDU operation or pair ID generation.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode, such as encode or decode transmissions, respectively. Pair ID Generator 415 may be configured to determine a pair ID, such as a UE determined pair ID. The Pair ID Generator 415 may be configured to determine the pair ID based on previous pair ID use, to generate a pair ID based on a PDU ID, reuse a PDU ID as a pair ID, allocate a pair ID for future use based on use, modify a pair ID, or a combination thereof. Such UE based pair ID determination and providing to the network enables enhanced redundant PDU session operation and enables enhanced functionality as compared to non-redundant PDU session operation.

Redundant PDU Manager 416 may be configured to manage redundant PDU session operations, such as when to enable redundant PDU sessions, release, or disable redundant PDU sessions, modify redundant PDU sessions, etc. For example, the Redundant PDU Manager 416 determines a particular type of pair ID generation mode, a redundant PDU session capability, a network configuration, etc. In some implementations, Redundant PDU Manager 416 may include or correspond to a RHF or perform one or more functions of a RHP.

Network entity 105 includes processor 430, memory 432, transmitter 434, receiver 436, encoder 437, decoder 438, Redundant PDU Manager 439, and antennas 231*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store PDU ID data 406, UL pair ID data 408, service table data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 105 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 105 described with reference to FIG. 2. Encoder 437, and decoder 438 may include the same functionality as described with reference to encoder 413 and decoder 414, reflectively. Redundant PDU Manager 439 may include similar functionality as described with reference to Redundant PDU Manager 416.

During operation of wireless communications system 400, network entity 105 may determine that UE 115 has pair ID determination capability. For example, UE 115 may transmit a message 448, such as a capabilities message, that includes a UE determined pair ID indicator 472. Indicator 472 may indicate UE based pair ID determination capability or a particular type of UE based pair ID determination, such as reuse of PDU ID as pair ID us described further with reference to FIGS. 7 and 8. In some implementations, network entity 105 sends control information to indicate to UE 115 that UE based pair ID determination operations are to be used. For example, in some implementations, message 448 (or another message, such as a response or a trigger message) is transmitted by the network entity 105.

In the example of FIG. 4, network entity 105 transmits an optional configuration transmission 450. The configuration transmission 450 may include or indicate a UE based pair ID determination configuration, such as settings data 444. The configuration transmission 450 (such as settings data 444 thereof) may indicate a pair ID format, a hashing function for generating pair IDs, a PDU ID reuse setting, etc.

After transmission of the message 448, the configuration transmission 450 (such as a RRC message or a DCI), or both, redundant PDU sessions may be established. In the example of FIG. 4, the UE 115 transmits a PDU session establishment message 460. The PDU session establishment message 460 may indicate a PDU ID which identifies the corresponding PDU session that is requested to be established. The PDU session establishment message 460 may include or correspond to a Non-access stratum (NAS) transmission. The PDU session establishment message 460 may include a DNN and a S-NSSAI.

Additionally, the UE 115 determines a pair ID 462 and transmits the pair ID 462 to the network entity 105. The pair ID 462 may be transmitted in the PDU session establishment message 460 or another message. In some implementations, the pair ID 462 is transmitted in a 5G System (5GS) session management (5GSM) message.

Network entity 105 receives the PDU session establishment message 460 and the pair ID 462, i.e., the UE determined pair ID. The network entity 105 may transmit a PDU session request message 464 (such as a first PDU session establishment message) responsive to the PDU session establishment message 460. For example, a first component of the network entity 105 transmits the PDU session request message 464 including the pair ID 462 to a second component of the network entity 105 or to second network entity 405*a*. In some implementations, the pair ID 462 is transmitted in a N2 Session Management (SM) container and/or the PDU session request message 464 corresponds to a N2 SM message or container. The PDU session request message 464 may also include the PDU ID or otherwise indicate the PDU session to be established.

Network entity 105 (or second network entity 405*a*) receives the PDU session request message 464 and may associate a PDU session, indicated by the PDU ID, with the pair ID. Additionally, the network entity 105 (or second network entity 405*a*) may associate the PDU session with the UE 115 and a servicing device 407 which provides data to the UE 115, such a redundant data. The above process, that is sending establishment and request messages may be repeated to setup redundant PDU sessions or additional redundant PDU sessions. For example a second establishment message is sent to the network entity 105 or a third network entity 405*b* by the UE 115, and a second request message is sent to the network entity 105 or the second network entity 405*a*.

Servicing device 407 may transmit data to UE 115 via one or more redundant connection paths. As illustrated in the example of FIG. 4, servicing device 407 transmits data transmissions 468 and 470 to UE 115 via different connection paths. For example, the first data transmission 468 may be sent via a second network entity 405*a* and the second data transmission 470 may be sent via third network entity 405*b*. The data transmissions 468 and 470 may include similar data or the same data in some implementations to provide increased reliability and reduced latency.

Figure 5:
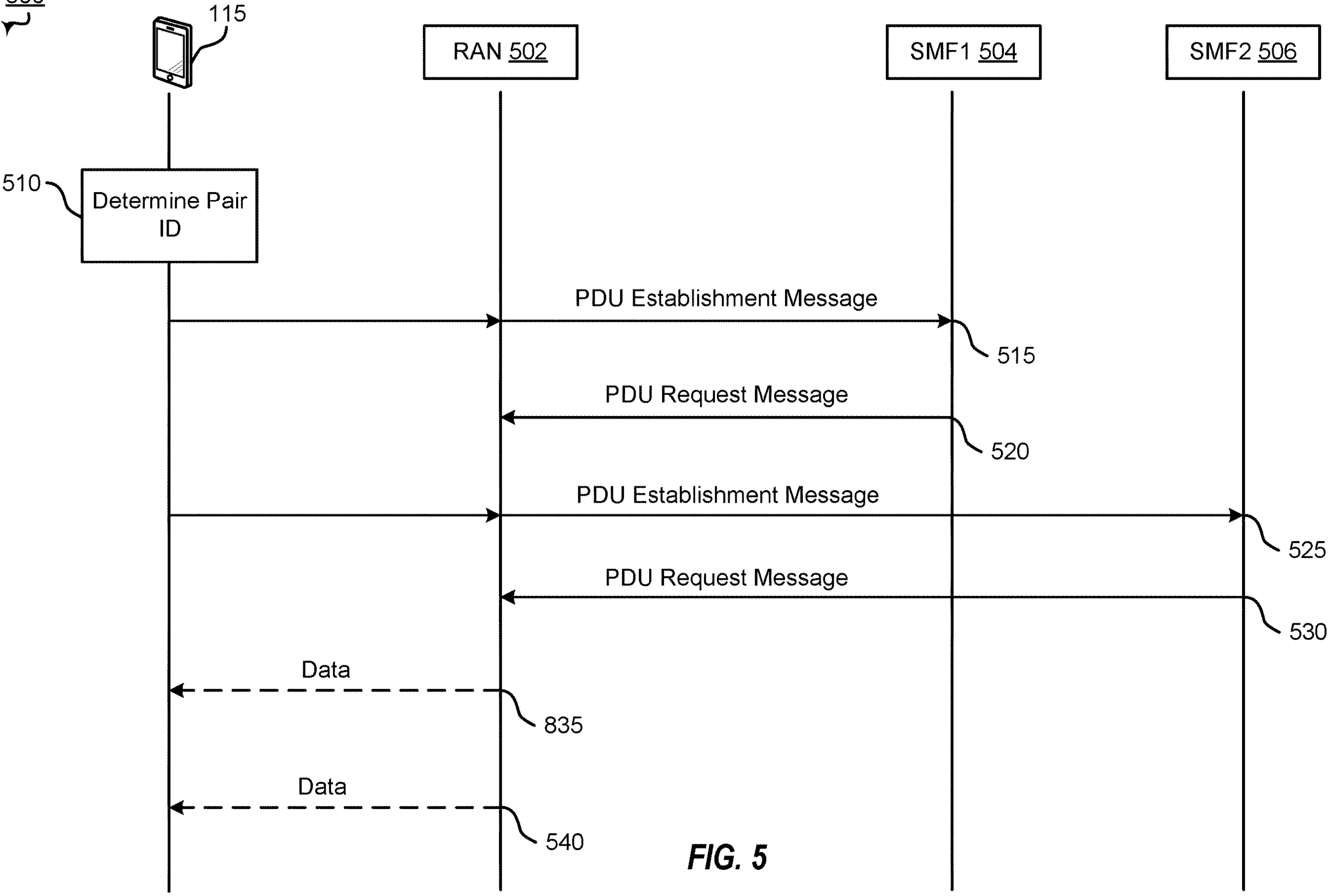
FIG. 5 is a ladder diagram illustrating an example of a process flow for a first example of redundant PDU session operation.

FIG. 5 is a ladder diagram illustrating an example of a process flow for a first example of redundant PDU session operation. Referring to FIG. 5, a process flow 500 is illustrated that supports redundant PDU session operation in accordance with aspects of the present disclosure. In some examples, process flow 500 may implement aspects of a wireless communications system 100 or 400. For example, a network entity or entities and a UE may perform one or more of the processes described with reference to process flow 500. Network entities may communicate with UE 115 by transmitting and receiving signals through TRPs. Alternative examples of the following may be implemented, where some steps are performed in a different order than described or are not performed at all. In some cases, steps may include additional features not mentioned below, or further steps may be added.

At 510, UE 115 may determine a pair ID for a PDU session, such as a first redundant PDU session. The determination may include generating or allocating a pair ID for the PDU session based on a service associated with the PDU session. For example, the UE 115 may retrieve a pair ID from a table based on a service identifier of or associated with the PDU session. As another example, the UE 115 may generate a pair ID using a hashing function and based on a service identifier of or associated with the PDU session or a PDU session ID.

At 515, UE 115 may transmit a first PDU session establishment message to a first SMF 504 (e.g., SMF1). As illustrated in FIG. 5, the first PDU session establishment message may be transmitted to the first SMF 504 via a RAN 502. The first PDU session establishment message may include the UE determined pair ID or the UE determined pair ID may be sent in another message, such as another message during a PDU session establishment operation.

First SMF 504 may receive the first PDU session establishment message from the UE 115 (and optionally via the RAN 502). At 520, first SMF 504 transmits a first PDU session request message to the RAN 502. For example, the first SMF 504 generates a first PDU session request message that includes the pair ID included in or sent alongside the first PDU session establishment message. The RAN 502 may receive the first PDU session establishment message and pair ID and may associate the PDU session indicated by the first PDU session establishment message with the pair ID. In some implementations, the first SMF 504 may send an acknowledgement message (ACK) to the UE 115, as described further with reference to FIG. 6.

At 525, UE 115 may transmit a second PDU session establishment message to a second SMF 506 (e.g., SMF2). As illustrated in FIG. 5, the second PDU session establishment message may be transmitted to the second SMF 506 via the RAN 502. The second PDU session establishment message may include the UE determined pair ID or the UE determined pair ID may be sent in another message, such as another message during a second PDU session establishment operation.

Second SMF 506 may receive the second PDU session establishment message from the UE 115 (and optionally via the RAN 502). At 530, second SMF 506 transmits a second PDU session request message to the RAN 502. For example, the second SMF 506 generates a second PDU session request message that includes the pair ID or the pair ID is sent alongside the second PDU session establishment message. The RAN 502 may receive the second PDU session establishment message and the pair ID and associate a second PDU session, indicated by or associated with the second PDU session establishment message, with the pair ID and with the first PDU session. The second SMF 506 may send a second ACK to the UE 115, as described further with reference to FIG. 6.

In some implementations, the UE 115 receives data, such as redundant data via the first and second redundant PDU sessions established. For example, at 535, RAN 502 may transmit first redundant data to the UE 115. Additionally, at 535, RAN 502 may transmit second redundant data to the UE 115. Alternatively, RAN 502 may assign the second PDU session to another RAN, such as a second or secondary RAN, and the secondary RAN may transmit the second redundant data to the UE 115.

Figure 6:
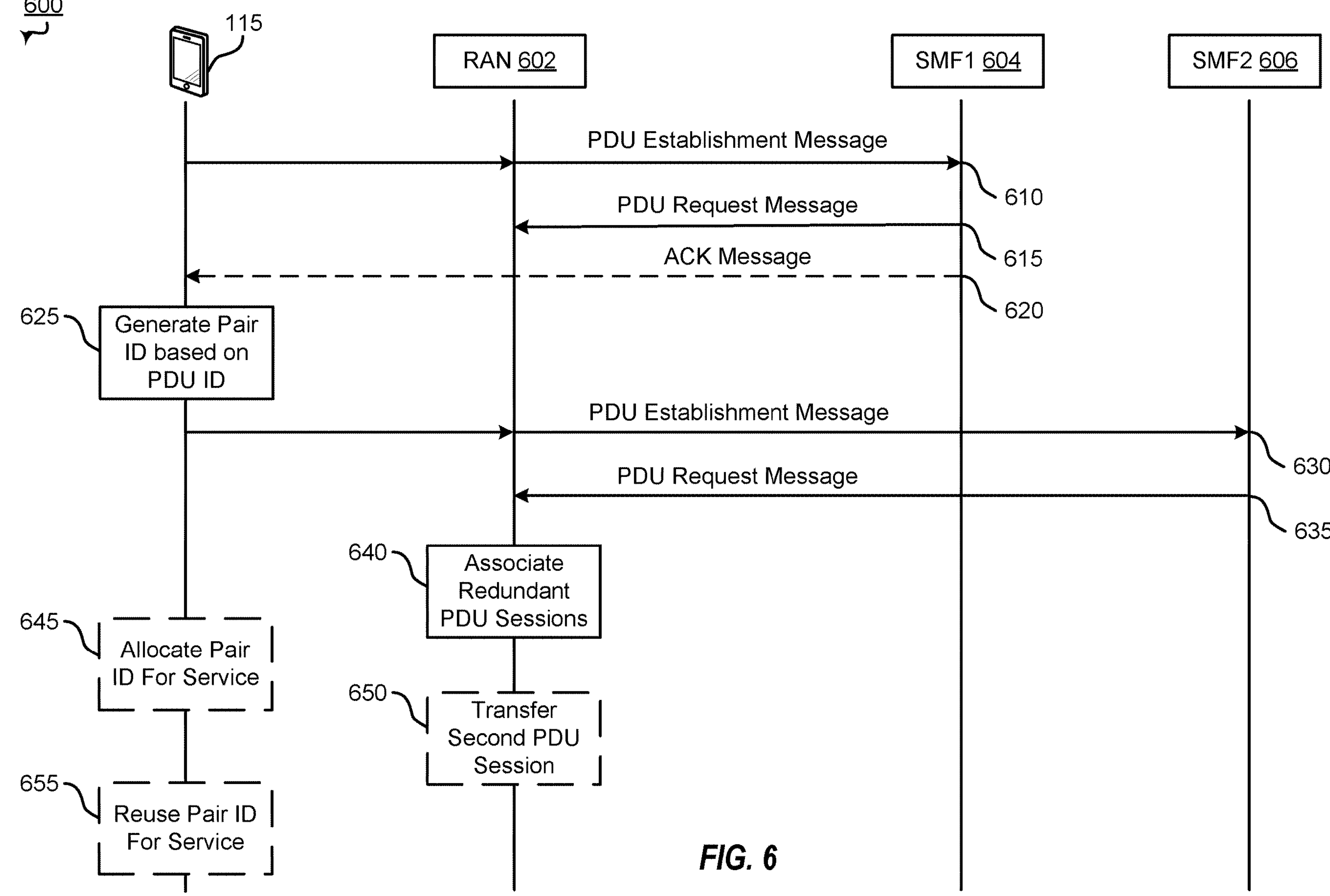
FIG. 6 is a ladder diagram illustrating an example of a process flow for a second example of redundant PDU session operation.

FIG. 6 is a ladder diagram illustrating an example of a process flow for a second example of redundant PDU session operation. Referring to FIG. 6, a process flow 600 is illustrated that supports redundant PDU session operation in accordance with aspects of the present disclosure. In some examples, process flow 600 may implement aspects of a wireless communications system 100 or 400. For example, a network entity or entities and a UE may perform one or more of the processes described with reference to process flow 600. Network entities may communicate with UE 115 by transmitting and receiving signals through TRPs. Alternative examples of the following may be implemented, where some steps are performed in a different order than described or are not performed at all. In some cases, steps may include additional features not mentioned below, or further steps may be added.

At 610, UE 115 may transmit a first PDU session establishment message to a first SMF 604 (e.g., SMF1). As illustrated in FIG. 6, the first PDU session establishment message may be transmitted to the first SMF 604 via a RAN 602. The first PDU session establishment message may not include a pair ID, such as not include a UE determined pair ID and a UE determined pair ID may not be sent in another message during a PDU session establishment operation.

First SMF 604 may receive the first PDU session establishment message from the UE 115 (and optionally via the RAN 602). At 615, first SMF 604 transmits a first PDU session request message to the RAN 602. For example, the first SMF 604 generates a first PDU session request message that includes a first PDU Session ID or the first PDU Session ID is sent alongside the first PDU session establishment message. The RAN 602 may receive the first PDU session establishment message and the first PDU Session ID and associate the PDU session indicated by the first PDU session establishment message with the first PDU Session ID.

At 620, in some implementations the first SMF 604 may send an acknowledgement message (ACK) to the UE 115. The ACK may indicate successful receipt of the first PDU session establishment message and/or granting of the PDU session.

At 625, UE 115 may generate a pair ID based on the PDU Session ID, also referred to herein us a PDU ID. The generation may include reusing the PDU Session ID as the pair ID or generating a pair ID based on the PDU Session ID of or associated with the first PDU session. To illustrate, the UE 115 may use a hashing function to convert the PDU Session ID to the pair ID or a table to retrieve the pair ID based on the PDU Session ID.

At 630, UE 115 may transmit a second PDU session establishment message to a second SMF 606 (e.g., SMF2). As illustrated in FIG. 6, the second PDU session establishment message may be transmitted to the second SMF 606 via the RAN 602. The second PDU session establishment message may include the UE determined pair ID or the UE determined pair ID may be sent in another message, such as another message during a second PDU session establishment operation.

Second SMF 606 may receive the second PDU session establishment message from the UE 115 (and optionally via the RAN 602). At 635, second SMF 606 transmits a second PDU session request message to the RAN 602. For example, the second SMF 606 generates a second PDU session request message that includes the pair ID or the pair ID is sent alongside the second PDU session establishment message. The RAN 602 may receive the second PDU session establishment message and the pair ID and associate a second PDU session, indicated by or associated with the second PDU session establishment message, with the pair ID and with the first PDU session. The second SMF 606 may send a second ACK to the UE 115, as described with reference 620.

At 640, RAN 602 may associate the redundant PDU sessions, the first PDU session and the second PDU session. For example, the RAN 602 may modify a table to indicate that the first and second PDU sessions are redundant sessions. As another example, RAN 602 may transfer one of the PDU sessions, such as described further with reference to 650.

At 645, UE 115 may allocated the pair ID for a service associated with the redundant PDU sessions. For example, the UE 115 may reserve the pair ID for the service by entering the pair ID (e.g., the first PDU Session ID) into a service table. To illustrate, when PDU sessions and/or redundant PDU sessions for the service are established, the UE 115 will provide the corresponding pair ID. The UE 115 may not use the pair ID for other services.

At 650, RAN 602 may transfer the second PDU session. For example, the RAN 602 may be a master RAN and associated with a particular base station or stations. The master RAN may transfer the second PDU session in another RAN, such as second or secondary RAN. The other RAN may be associated with another base station or stations and may transfer or coordinate the transfer of redundant date to the UE 115.

Figure 7:
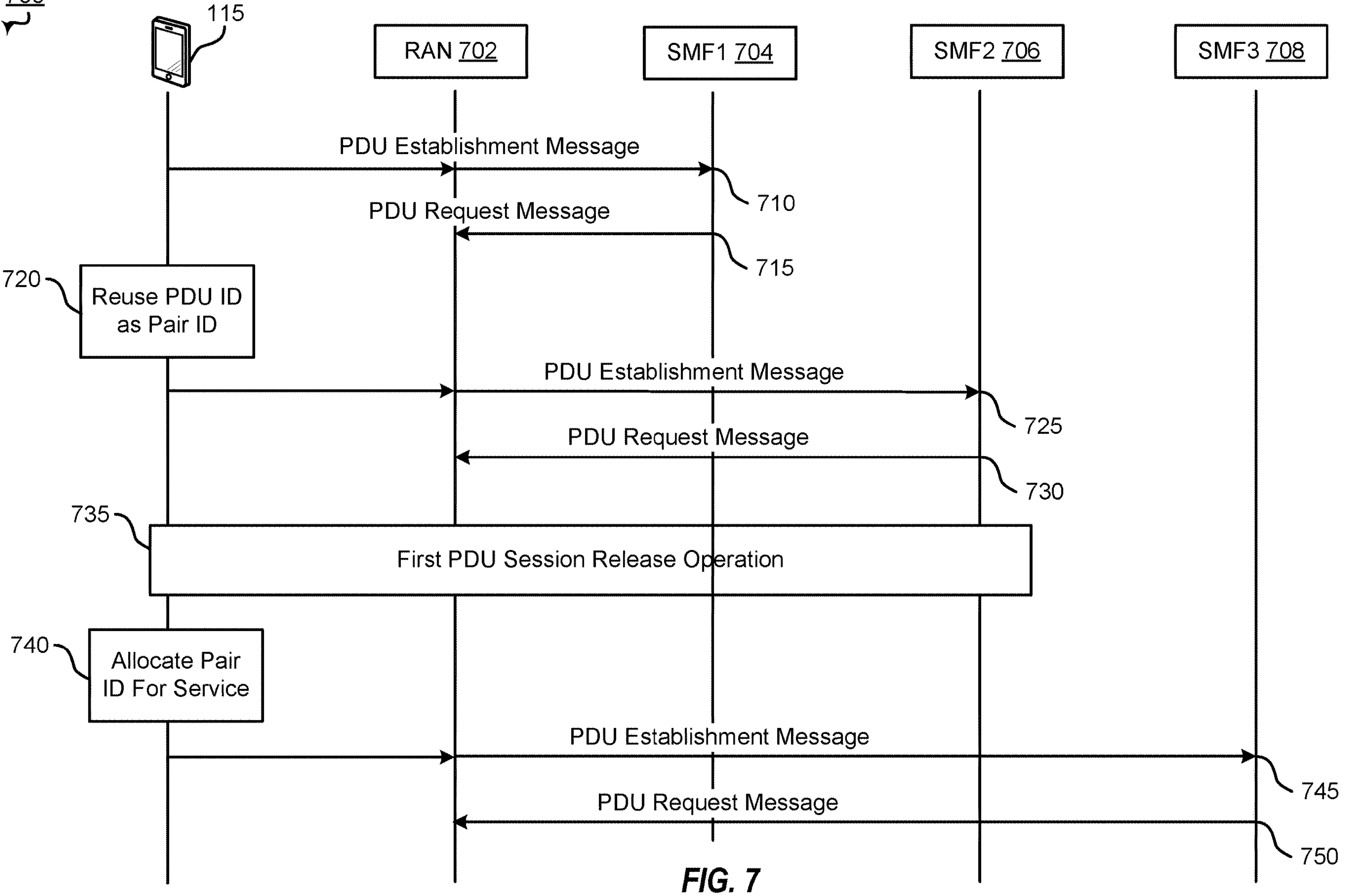
FIG. 7 is a ladder diagram illustrating an example of a process flow for a third example of redundant PDU session operation.
Figure 8:
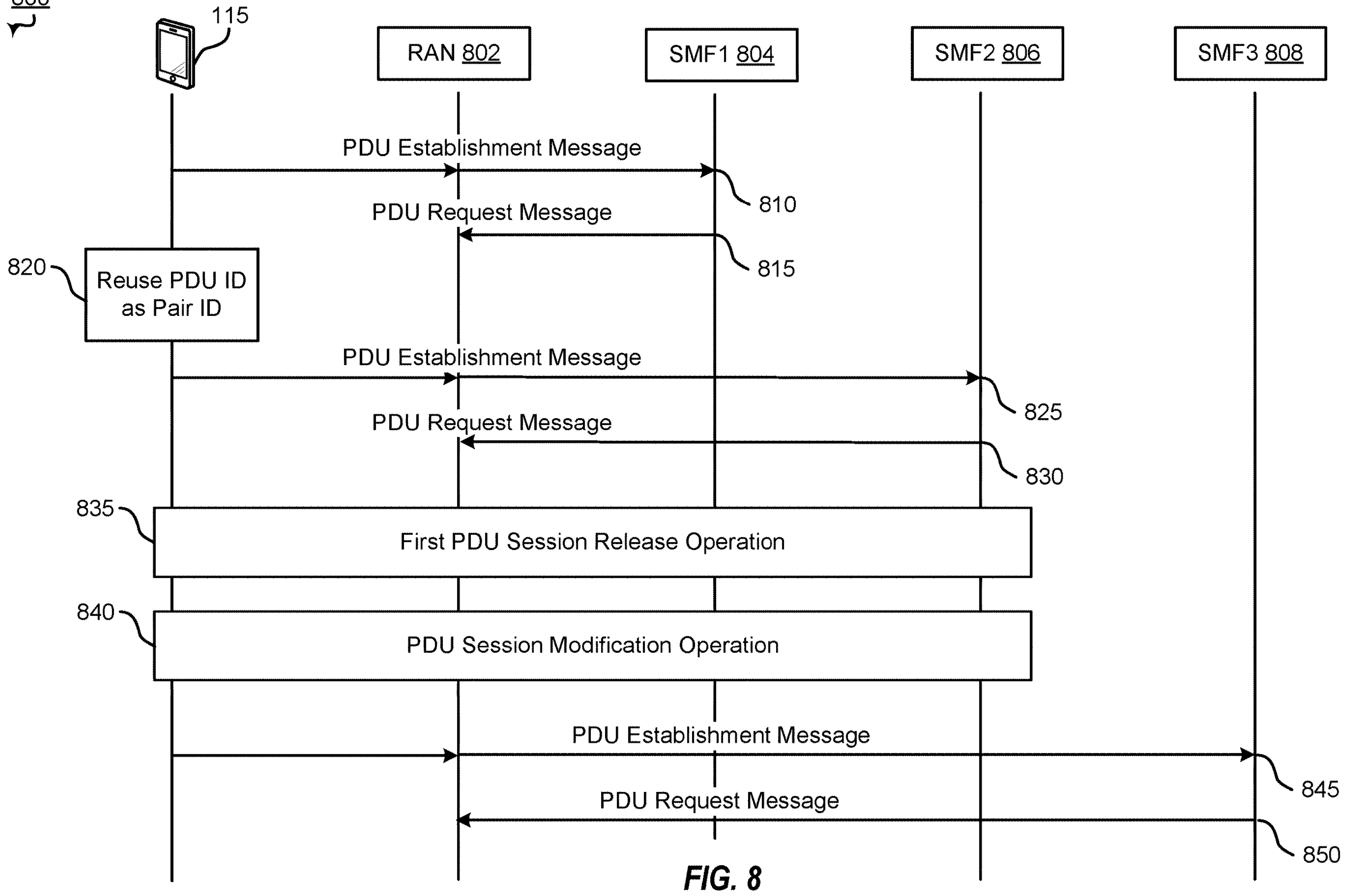
FIG. 8 is a ladder diagram illustrating an example of a process flow for a fourth example of redundant PDU session operation.

At 655, UE 115 may reuse the pair ID for the service again in the future, either for a PDU session or redundant PDU sessions, as described further with reference to FIGS. 7 and 8.

Although 640-655 are illustrated one after another in the example of FIG. 6, in other implementations any of 640-655 may be performed partially concurrently with one or more of 640-655 and/or before another of 640-655. In some implementations, the UE 115 receives data, such as redundant data via the first and second redundant PDU sessions established, as described with reference to FIG 5.

FIG. 7 is a ladder diagram illustrating an example of a process flow for a third example of redundant PDU session operation. Referring to FIG 7, a process flow 700 is illustrated that supports redundant PDU session operation in accordance with aspects of the present disclosure. In some examples, process flow 700 may implement aspects of a wireless communications system 100 or 400. For example, a network entity or entities and a UE may perform one or more of the processes described with reference to process flow 700. Network entities may communicate with UE 115 by transmitting and receiving signals through TRPs. Alternative examples of the following may be implemented, where some steps are performed in a different order than described or are not performed at all. In some cases, steps may include additional features not mentioned below, or further steps may be added.

At 710, UE 115 may transmit a first PDU session establishment message to a first SMF 704 (e.g., SMF1). As illustrated in FIG. 7, the first PDU session establishment message may be transmitted to the first SMF 704 via a RAN 702. The first PDU session establishment message may not include a pair ID, such as not include a UE determined pair ID and a UE determined pair ID may not be sent in another message during a PDU session establishment operation.

First SMF 704 may receive the first PDU session establishment message from the UE 115 (and optionally via the RAN 702). At 715, first SMF 704 transmits a first PDU session request message to the RAN 702. For example, the first SMF 704 generates a first PDU session request message that includes a first PDU Session ID included in or sent alongside the first PDU session establishment message. The RAN 702 may receive the first PDU session establishment message and the first PDU Session ID and associate the PDU session indicated by the first PDU session establishment message with the first PDU Session ID. In some implementations, the first SMF 704 may send an acknowledgement message (ACK) to the UE 115, as described with reference to FIG. 6.

At 720, UE 115 may reuse the PDU Session ID of or associated with the first PDU session as the pair ID. To illustrate, the UE 115 may use the PDU Session ID of the first session, first PDU Session ID, as the pair ID.

At 725, UE 115 may transmit a second PDU session establishment message to a second SMF 706 (e.g., SMF2). As illustrated in FIG. 7, the second PDU session establishment message may be transmitted to the second SMF 706 via the RAN 702. The second PDU session establishment message may include the UE determined pair ID or the UE determined pair ID may be sent in another message, such as another message during a second PDU session establishment operation.

Second SMF 706 may receive the second PDU session establishment message from the UE 115 (and optionally via the RAN 702). At 730, second SMF 706 transmits a second PDU session request message to the RAN 702. For example, the second SMF 706 generates a second PDU session request message that includes the pair ID or the pair ID is sent alongside the second PDU session establishment message. The RAN 702 may receive the second PDU session establishment message and the pair ID and associate a second PDU session, indicated by or associated with the second PDU session establishment message, with the pair ID and with the first PDU session. The second SMF 706 may also send a second ACK to the UE 115, as described with reference to 620.

The RAN 702 may receive the second PDU session establishment message and the pair ID and associate a second PDU session, indicated by or associated with the second PDU session establishment message, with the pair ID and with the first PDU session. Additionally, the RAN 702 may associate the redundant PDU sessions, the first PDU session and the second PDU session. For example, the RAN 702 may modify a table to indicate that the first and second PDU sessions are redundant sessions based on the pair ID. In some implementations, the RAN 702 may transfer the second PDU session. For example, the RAN 802 may be a master RAN and associated with a particular base station or stations. The master RAN may transfer the second PDU session to another RAN, such as second or secondary RAN. The other RAN may be associated with another base station or stations and may transfer or coordinate the transfer of redundant date to the UE 115.

At 735, one or more of 115 and 702-706 may perform a PDU session release operation. For example, the UE 115 and RAN 702 may perform a first PDU session release and release the first PDU session ceasing redundant PDU operation, and while still maintaining the second PDU session. In some implementations, releasing one or more particular PDU sessions may include modifying one or more of the other remaining PDU sessions of the redundant PDU sessions, as described further with reference to FIG. 8.

At 740, UE 115 may allocate the pair ID for a service associated with the redundant PDU sessions. For example, the UE 115 may reserve the pair ID for the service by entering the pair ID (e.g., the first PDU Session ID) into a service table. To illustrate, when a PDU session and/or redundant PDU sessions for the service are established, the UE 115 may provide the corresponding pair ID. The UE 115 may not use the pair ID for other services. Although, the UE allocated the pair ID for the service after release, the UE 115 may allocate the pair ID for the service after 720.

Thus, UE 115 may reuse the pair ID for the service again in the future, either for a PDU session or redundant PDU sessions for example. At 720, UE 115 may reuse the allocated pair ID. In the example shown in FIG. 7, the allocated pair ID is the PDU Session ID of or associated with the first PDU session as the pair ID which has been reused as the pair ID. To illustrate, the UE 115 may use the PDU Session ID of the first session, first PDU Session ID, as the pair ID for subsequent redundant PDU sessions for the first service.

At 745, UE 115 may transmit a third PDU session establishment message to a third SMF 708 (e.g., SMF3). As illustrated in FIG. 7, the third PDU session establishment message may be transmitted to the third SMF 708 via the RAN 702. The third PDU session establishment message may include the UE determined pair ID or the UE determined pair ID may be sent in another message, such as another message during a third PDU session establishment operation.

Third SMF 708 may receive the third PDU session establishment message from the UE 115 (and optionally via the RAN 702). At 750, third SMF 708 transmits a third PDU session request message to the RAN 702. For example, the third SMF 708 generates a third PDU session request message that includes the pair ID or the pair ID is sent alongside the third PDU session establishment message. The RAN 702 may receive the third PDU session establishment message and the pair ID and associate a third PDU session, indicated by or associated with the third PDU session establishment message, with the pair ID and with the second PDU session. The third SMF 708 may send a third ACK to the UE 115, as described with reference to 620.

FIG. 8 is a ladder diagram illustrating an example of a process flow for a fourth example of redundant PDU session operation. Referring to FIG. 8, a process flow 800 is illustrated that supports redundant PDU session operation in accordance with aspects of the present disclosure. In some examples, process flow 800 may implement aspects of a wireless communications system 100 or 400. For example, network entities, such as RAN 802 and SMFs 808-808, and a UE may perform one or more of the processes described with reference to process flow 800. Network entities may communicate with UE 115 by transmitting and receiving signals through corresponding TRPs. In other cases, RAN 802 and SMFs 808-808 may correspond to different network component (e.g., different TRPs) of the same network entity (such as the same base station or network). Alternative examples of the following may be implemented, where some steps are performed in a different other than described or are not performed at all. In some cases, steps may include additional features not mentioned below, or further steps may be added.

At 810, UE 115 may transmit a first PDU session establishment message to a first SMF 804 (e.g., SMF1). As illustrated in FIG. 5, the first PDU session establishment message may be transmitted to the first SMF 804 via a RAN 802. The first PDU session establishment message may not include a pair ID, such as not include a UE determined pair ID and a UE determined pair ID may not be sent in another message during a PDU session establishment operation.

First SMF 804 may receive the first PDU session establishment message from the UE 115 (and optionally via the RAN 802). At 815, first SMF 804 transmits a first PDU session request message to the RAN 802. For example, the first SMF 804 generates a first PDU session request message that includes a first PDU Session ID included in or sent alongside the first PDU session establishment message. The RAN 802 may receive the first PDU session establishment message and the first PDU Session ID and associate the PDU session indicated by the first PDU session establishment message with the first PDU Session ID. In some implementations, the first SMF 804 may send an acknowledgement message (ACK) to the UE 115, as described with reference to FIG. 6.

At 820, UE 115 may reuse the PDU Session ID of or associated with the first PDU session as the pair ID. To illustrate, the UE 115 may use the PDU Session ID of the first session, first PDU Session ID, as the pair ID.

At 825, UE 115 may transmit a second PDU session establishment message to a second SMF 806 (e.g., SMF2). As illustrated in FIG. 8, the second PDU session establishment message may be transmitted to the second SMF 806 via the RAN 802. The second PDU session establishment message may include the UE determined pair ID or the UE determined pair ID may be sent in another message, such as another message during a second PDU session establishment operation.

Second SMF 806 may receive the second PDU session establishment message from the UE 115 (and optionally via the RAN 802). At 830, second SMF 806 transmits a second PDU session request message to the RAN 802. For example, the second SMF 806 generates a second PDU session request message that includes the pair ID or the pair ID is sent alongside the second PDU session establishment message. The second SMF 806 may also send a second ACK to the UE 115, as described with reference to 620.

The RAN 802 may receive the second PDU session establishment message and the pair ID and associate a second PDU session, indicated by or associated with the second PDU session establishment message, with the pair ID and with the first PDU session. Additionally, the RAN 802 may associate the redundant PDU sessions, the first PDU session and the second PDU session. For example, the RAN 802 may modify a table to indicate that the first and second PDU sessions are redundant sessions based on the pair ID. In some implementations, the RAN 802 may transfer the second PDU session. For example, the RAN 802 may be a master RAN and associated with a particular base station or stations. The master RAN may transfer the second PDU session to another RAN, such as second or secondary RAN. The other RAN may be associated with another base station or stations and may transfer or coordinate the transfer of redundant date to the UE 115.

At 835, one or more of 115, and 802-806 may perform a first PDU session release operation, similar to 735 of FIG. 7. Although the first PDU session is released in the examples of FIGS. 7 and 8, in other examples, the second PDU session or both sessions are released.

At 840, one or more of 115 and 802-806 may perform PDU session modification operation. For example, the network entities 802-806 and UE 115 may adjust a PDU Session ID, a pair ID, or both of one or more remaining PDU sessions of the original redundant PDU sessions. In the example of FIG. 8, the first PDU session is released and the second PDU session is modified. For example, the pair ID of the second PDU session is modified to be a second PDU Session ID of the second PDU session. To illustrate, UE 115 sends a PDU session modification request message to a SMF. In a particular implementation, UE 115 includes pair ID remove information in the session modification request message and transmits the session modification request message to the corresponding SMF that manages the PDU session to be adjusted. The pair ID remove information may be a new indication in the PDU session modification request message, or a new value (e.g., new cause value) in the PDU session modification request message to indicate removal of the pair ID. The SMF may send, responsive to the session modification request message, a PDU session modification message to request that the RAN remove the pair ID. In a particular implementation, the PDU session modification message is a N2 SM message.

As described with reference to FIG. 7, UE 115 may allocate the pair ID for a service associated with the redundant PDU sessions. For example, the UE 115 may reserve or modify the pair ID for the service by entering the pair ID (e.g., the second or modified PDU Session ID) into a service table. To illustrate, after allocation or reserving, when a PDU session and/or redundant PDU sessions for the service are established, the UE 115 may provide the corresponding pair ID. The UE 115 may not use the pair ID for other services. Although, the UE allocated the pair ID for the service after release in the example of FIG. 8, the UE 115 may allocate the pair ID for the service after 820 in other implementations.

Thus. UE 115 may reuse the pair ID for the service again in the future, either for a PDU session or redundant PDU sessions. For example, at 845, UE 115 may transmit a third PDU session establishment message to a third SMF 808 (e.g., SMF3). As illustrated in FIG. 8, the third PDU session establishment message may be transmitted to the third SMF 808 via the RAN 802. The third PDU session establishment message may include the UE determined pair ID or the UE determined pair 10 may be sent in another message, such as another message during a third PDU session establishment operation.

Third SMF 808 may receive the third PDU session establishment message from the UE 115 (and optionally via the RAN 802). At 850, third SMF 808 transmits a third PDU session request message to the RAN 802. For example, the third SMF 808 generates a third PDU session request message that includes the pair ID or the pair ID is sent alongside the third PDU session establishment message. The RAN 802 may receive the third PDU session establishment message and the pair ID and associate a third PDU session, indicated by or associated with the third PDU session establishment message, with the pair ID and with the second PDU session. The third SMF 808 may send a third ACK to the UE 115, as described with reference to 620.

Although FIGS. 7-9 illustrate that a SMF provides a PDU Session ID and the UE determines a pair ID based on the network provided PDU Session ID, in other implementations the network may provide pair ID when setting up a first PDU session for a particular service. Then, after then pair ID is provided to the UE a first time or one time, the UE may store the pair ID and continue to use the pair ID for the service.

Figure 13:
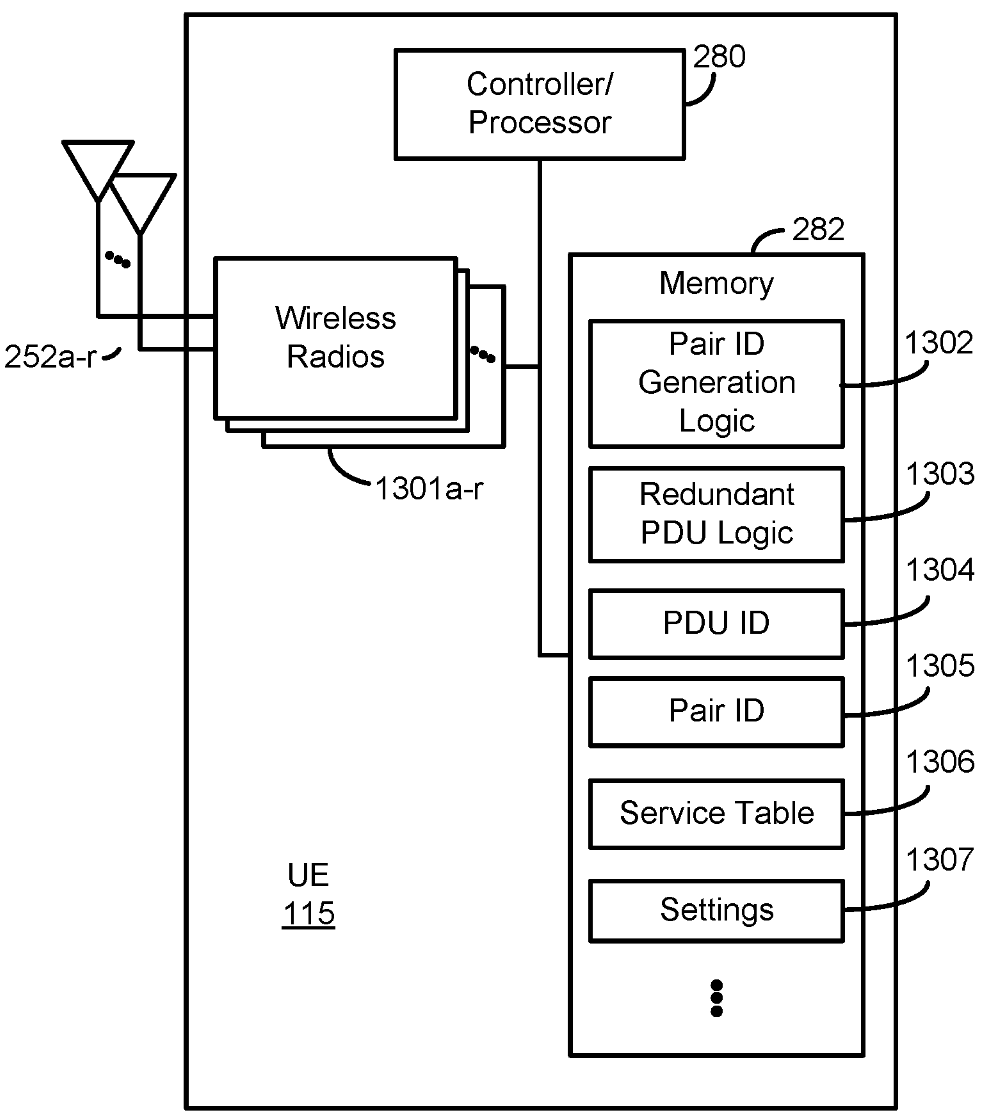
FIG. 13 is a block diagram conceptually illustrating an example design of a UE.

FIG. 9 is a block diagram illustrating example blocks executed by a UE. The example blocks will also be described with respect to the UE 115 as illustrated in FIG. 13. FIG. 13 is a block diagram conceptually illustrating an example design of a UE. FIG. 13 illustrates a UE 115 configured according to one aspect of the present disclosure. The UE 115 includes the structure, hardware, and components as illustrated for the UE 115 of FIGS. 2 or 4. For example, the UE 115 includes the controller/processor 280, which operates to execute logic or computer instructions stored in the memory 282, as well as controlling the components of the UE 115 that provide the features and functionality of the UE 115. The UE 115, under control of the controller/processor 280, transmits and receives signals via the wireless radios 1301*a-r* and the antennas 252*a-r*. The wireless radios 1301*a-r* includes various components and hardware, as illustrated in FIG. 2 for the UE 115, including the modulator/demodulators 254*a-r* the MIMO detector 256, the receive processor 258, the transmit processor 264, and the TX MIMO processor 266.

As shown, the memory 282 may include Pair ID Generation Logic 1302, Redundant PDU Logic 1303, PDU ID data 1304, pair ID data 1305, service table data 1306, and settings data 1307. The PDU ID data 1304, the pair ID data 1305, the service table data 1306, and the settings data 1307 may include or correspond to PDU ID data 406, pair ID data 408, service table data 442, and settings data 444. The Pair ID Generation Logic 1302 may include or correspond to the Pair ID Generator 415. The Redundant PDU Logic 1303 may include or correspond to the Redundant PDU Manager 416. In some aspects, the logic 1302 and 1303, may include or correspond to processor(s) 280. The UE 115 may receive signals from or transmit signals to a base station or base stations, such as the base station 105 or the network entity or entities 105, 405. When communicating with a single base station or serving cell, the UE 115 may receive signals from or transmit signals to multiple TRPs of the single base station or serving cell.

Referring to FIG. 9, at block 90, the UE 115 determines a pair identifier (ID). For example, UE 115 determines a pair ID as described with reference to FIGS. 4-8, such as described at 510, 625, 720, 740, 820, etc. The UE 115 may generate or retrieve an allocated pair ID based on the PDU ID, the service, or a combination thereof.

At block 901, the UE 115 transmits a protocol data unit (PDU) session establishment message and the pair ID. For example, UE 115 transmits a PDU session establishment message 460 and a pair ID 462 to a network entity 105 as described with reference to FIG. 4. As another example, UE 115 transmits a PDU session establishment message and a pair ID 462 (which may be included in the PDU session establishment message 460) as described with reference to FIGS. 5-8, such as described at 515, 630, 725, 745, 825, etc. The PDU session establishment message may cause redundant PDU sessions to be established.

In some implementations, the UE 115 may execute one or more additional blocks, such as to perform one or more other operations described herein. For example, the UE 115 may transmit a second PDU session establishment message, a third PDU session establishment message, or both, and/or may have already sent a prior PDU session establishment message with the same pair ID. The UE determined and provided pair ID enable a network entity, such as a master RAN, to associate PDU sessions to form redundant PDU sessions.

As another example, the UE 115 may receive a data transmission responsive to the establishing redundant PDU session. In some implementations, the UE receives multiple redundant data transmissions (e.g., same or similar data payload) via different connection paths from a servicing device. For example, the UE may receive a first data transmission from a first network entity (e.g., a first gNB) and a second data transmission from a second network entity (e.g., a second gNB). Additionally, or alternatively, the UE 115 may perform or participate in PDU session release operations and/or PDU session modification operations, as described with reference to FIGS. 7 and 8. In addition, a UE 115 may allocate or reserve pair IDs for a particular service, as described with reference to FIGS. 6 and 7, such as at 645, 740, etc.

Figure 14:
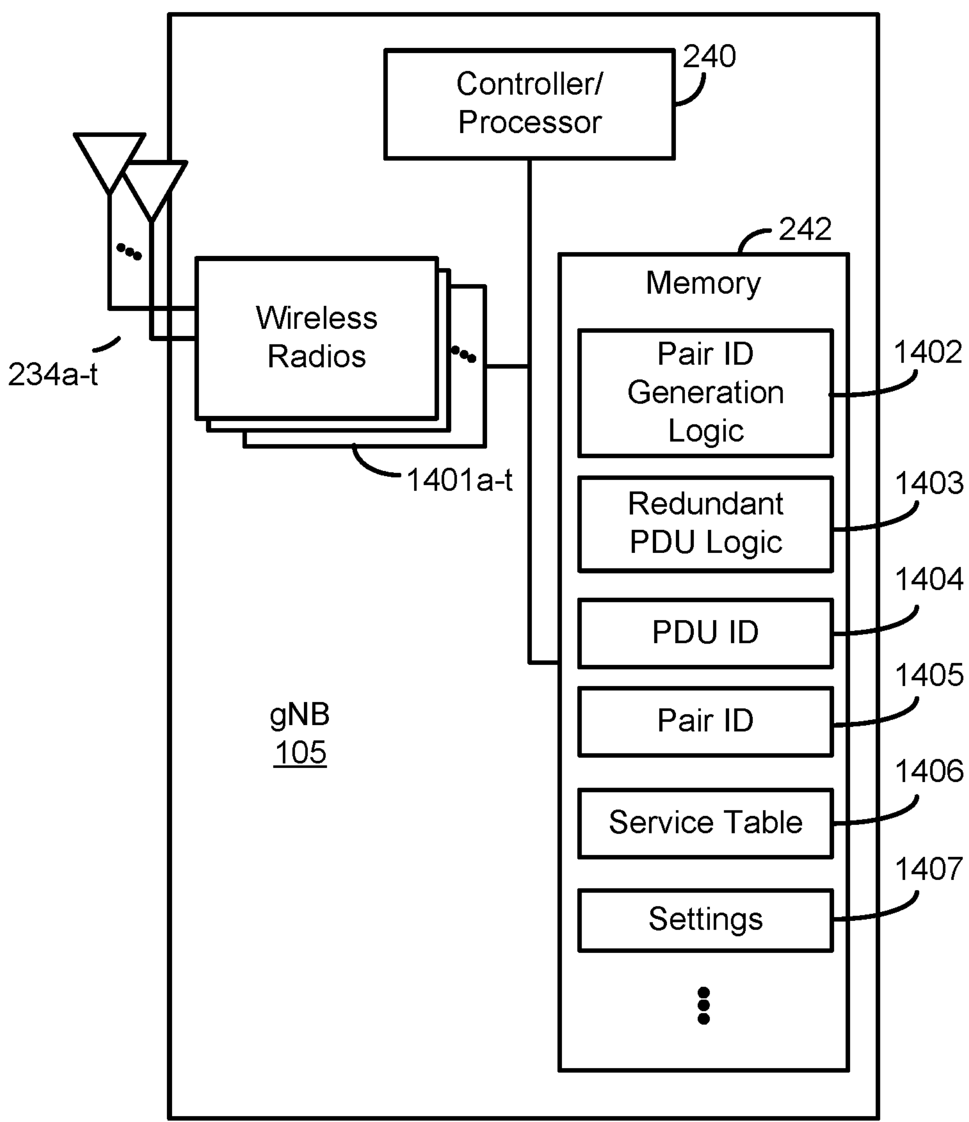
FIG. 14 is a block diagram conceptually illustrating an example design of a network entity.

FIG. 10 is a block diagram illustrating example blocks executed by a network entity. The network entity may include or correspond to a base station or a TRP thereof, configured according to an aspect of the present disclosure. The example blocks will also be described with respect to a network entity as illustrated in FIG. 14. FIG. 14 is a block diagram conceptually illustrating an example design of a particular network entity, base station 105 (such as a gNB or eNB), a RAN, an SMF, or a combination thereof. FIG. 14 illustrates a base station 105, also referred to as gNB 105, configured according to one aspect of the present disclosure. The gNB 105 includes the structure, hardware, and components as illustrated for gNB 105 of FIG. 2. For example, gNB 105 includes controller/processor 240, which operates to execute logic or computer instructions stored in memory 242, as well as controlling the components of gNB 105 that provide the features and functionality of gNB 105. The gNB 105, under control of controller/processor 240, transmits and receives signals via wireless radios 1401*a-t* and antennas 234*a-r*. Wireless radios 1401*a-t* includes various components and hardware, as illustrated in FIG. 2 for gNB 105, including modulator/demodulators 232*a-t*. MIMO detector 236, receive processor 238, transmit processor 220, and TX MIMO processor 230. The data 1402-1407 in memory 242 may include or correspond to the corresponding data 1302-1307 in memory 282, respectively.

Referring to FIG. 10, at block 1000, a network entity, such as gNB 105 (or a RAN thereof), receives, from a second network entity (e.g., a SMF), a protocol data unit (PDU) session request message including a pair identifier (ID). For example, a component of network entity 105 receives a PDU session request message 464 from another component of network entity 105. As another example, a second network entity 405*a* receives a PDU session request message 464 from network entity 105, as described with reference to FIG. 4. As yet another example, a RAN receives a PDU session request message from a SMF as described with reference to FIGS. 5-8. such as at 520, 635, 730, 750, 830, etc. The PDU session request message may be responsive to a PDU session establishment message received at the second network entity and which included a UE determined pair identifier (ID).

At block 1001, the gNB 105 (or a RAN thereof) associates a PDU session indicated by the PDU session request message with the pair ID, similar to block 901. For example, network entity 105 (or second network entity 405) associates the PDU session with the pair ID included in the PDU session request message, which was determined and provided by the UE. As another example, a RAN associates a PDU session as described with reference to FIGS. 5-8 such as at 640. In some implementations, the PDU session is indicated by a PDU ID of the PDU session request message, and the gNB 105, determines the PDU session based on the PDU ID.

In some implementations, the gNB 105 may execute one or more additional blocks, such as to perform one or more other operations described herein. For example, the gNB 105 may transmit a second PDU session request message, a third PDU session request message, or both, and/or may have already sent a prior PDU session request message with the same pair ID. The UE determined and provided pair ID enables the gNB 105, such as a master RAN, to associate PDU sessions to form redundant PDU sessions.

As another example, the gNB 105 may transmit a data transmission responsive to the establishing redundant PDU session. In some implementations, the gNB 105 transmits multiple redundant data transmissions (e.g., same or similar data payload). For example, the gNB 105 may transmit a first redundant data transmission to the UE and transmit a second redundant data transmission to the UE.

Additionally, or alternatively, the gNB 105 may perform or participate in PDU session release operations and/or PDU session modification operations, as described with reference to FIGS. 7 and 8. In addition, the gNB 105 may perform a RAN or gNB transfer operation as described with reference to FIG. 6, such as at 650. In such implementations, the gNB 105 may transmit a first redundant data transmission to the UE and a second gNB may transmit a second redundant data transmission to the UE.

FIG. 11 is a block diagram illustrating another example of blocks executed by a UE. The example blocks will also be described with respect to the UE 115 as illustrated in FIG. 9 and as described above. Referring to FIG. 11, at block 1100, the UE 115 determines a pair identifier (ID) for a protocol data unit (PDU) session, such as described with reference to block 900.

At block 1101, the UE 115 generates a PDU session establishment message, the PDU session establishment message including the pair ID. For example, the UE 115 includes the pair ID in the PDU session establishment message as described with reference to FIGS. 4-8.

At block 1102, the UE 115 transmits the PDU session establishment message including the pair ID, such as described with reference to block 901. For example, the UE 115 transmits the PDU session establishment message, including the pair ID, as described with reference to FIGS. 4-8.

In some implementations, the UE 115 may execute one or more additional blocks, such as to perform one or more other operations described herein. For example, the UE 115 may execute one or more additional blocks as described with reference to FIGS. 4-9.

FIG. 12 is a block diagram illustrating another example of blocks executed by a network entity. The network entity may include or correspond to a base station or a TRP thereof, configured according to an aspect of the present disclosure. The example blocks will also be described with respect to base station 105 (such as a gNB 105) as illustrated in FIG. 14. Referring to FIG. 12, at block 1200, a network entity, such as gNB 105 or a SMF associated with gNB 105, receives, from a user equipment (UE), a protocol data unit (PDU) session establishment message and a pair identifier (ID). For example, network entity 105 receives a PDU session establishment message 460 and a pair ID 462. As another example, a SMF receives a PDU session establishment message from a UE, as described with reference to FIGS. 5-8. such as at 515, 630, 725, 745, 825, etc. As described above, the pair ID may be a UE determined pair ID.

At block 1201, the gNB 105 transmits a PDU session request message responsive to the PDU session establishment message, the PDU session request message including the pair ID. For example, network entity 105 transmits a PDU session request message 464 responsive to another component of network entity 105 or to a second network entity 405, as described with reference to FIG. 4. As another example, a SMF transmits receives a PDU session request message to a RAN, as described with reference to FIGS. 5-8, such as at 520, 635, 730, 750, 830, etc.

In some implementations, the gNB 105 may execute one or more additional blocks, such as to perform one or more other operations described herein. For example, the gNB 105 may execute one or more additional blocks as described with reference to FIGS. 4-8 and 10.

It is noted that one or more blocks (or operations) described with reference to FIGS. 9, 10, 11, or 12 may be combined with one or more blocks (or operations) of another of figure. For example, one or more blocks of FIGS. 9 or 10 may be combined with one or more blocks (or operations) of another of FIGS. 1, 2, 3A, 3B, 4, 5, 6, 7, or 8. Additionally, or alternatively, one or more operations described above with reference to FIGS. 1-8 may be combined with one or more operations described with reference to FIG. 9, 10, 11, or 12.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 9, 10, 11, or 12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) for wireless communication, comprising:

a memory; and at least one processor coupled to the memory, wherein the at least one processor is configured to cause the UE to:

transmit a first protocol data unit (PDU) session establishment message;

generate a pair identifier (ID), wherein a value of the pair ID is an indication shared by redundant PDU sessions and configured to associate PDU sessions together as redundant; and transmit a second PDU session establishment message and the pair ID.

2. The UE of claim 1, wherein the first PDU session establishment message includes the pair ID.

3. The UE of claim 1, wherein, to transmit the pair ID, the at least one processor is configured to:

transmit a message including the pair ID, wherein the message including the pair ID is separate from the first PDU session establishment message.

4. The UE of claim 1, wherein, to transmit the first PDU session establishment message, the at least one processor is configured to transmit the first PDU session establishment message to a first network entity, and wherein the first PDU session establishment message is configured to cause the first network entity to send a PDU session request message to a second network entity.

5. The UE of claim 4, wherein the PDU session request message includes the pair ID.

6. The UE of claim 1, wherein the second PDU session establishment message includes the pair ID and is configured to establish the redundant PDU sessions for the first and second PDU session establishment messages.

7. The UE of claim 1, wherein, to generate the pair ID, the at least one processor is configured to allocate the value of the pair ID based on a service associated with a PDU session corresponding to the first PDU session establishment message.

8. The UE of claim 1, wherein, to transmit the first PDU session establishment message, the at least one processor is configured to transmit the first PDU session establishment message to a first network entity and wherein the first PDU session establishment message includes the pair ID, and wherein, to transmit the second PDU session establishment message, the at least one processor is configured to:

transmit the second PDU session establishment message to a third network entity, wherein the second PDU session establishment message is configured to cause the third network entity to send a second PDU session request message to a second network entity.

9. The UE of claim 8, wherein the second network entity comprise a radio access network (RAN); or the first and third network entities comprise Session Management Functions (SMFs).

10. The UE of claim 1, wherein, to generate the pair ID, the at least one processor is configured to determine a PDU session ID from a prior PDU session as the pair ID.

11. The UE of claim 1, wherein, to generate the pair ID, the at least one processor is configured to determine the pair ID from a services table based on a corresponding service of a PDU session associated with the first PDU session establishment message.

12. The UE of claim 1, wherein, to transmit the first PDU session establishment message, the at least one processor is configured to transmit the first PDU session establishment message to a first network entity and wherein the first PDU session establishment message excludes the pair ID and is transmitted prior to determination of the pair ID, and wherein, to transmit the second PDU session establishment message, the at least one processor is configured to:

transmit, after the determination of the pair ID, the second PDU session establishment message to a third network entity, and wherein the second PDU session establishment message is configured to cause the third network entity to send a second PDU session request message to a second network entity.

13. The UE of claim 12, wherein the at least one processor is configured to:

transmit, after transmission of the first PDU session establishment message, a third PDU session establishment message to a fourth network entity, wherein the third PDU session establishment message includes the pair ID, and wherein the third PDU session establishment message is configured to cause the fourth network entity to send a third PDU session request message to the second network entity.

14. The UE of claim 1, wherein the at least one processor is configured to assign the pair ID to a particular service, wherein, to assign the pair ID to the particular service, the at least one processor is configured to edit a service table to correlate the pair ID with the particular service.

15. The UE of claim 14, wherein the services table is a URLLC service table.

16. The UE of claim 1, wherein the at least one processor is configured to perform a PDU session modification operation, wherein the PDU session modification operation includes transmitting a modification request to a service providing device including remove information corresponding to the pair ID.

17. The UE of claim 1, wherein the at least one processor is configured to:

receive first data via a first PDU session established by the first PDU session establishment message; and receive second data via a second PDU session established by the second PDU session establishment message, the second data the same as the first data.

18. The UE of claim 17, wherein:

to receive the first data, the at least one processor is configured to receive the first data from a particular servicing device via a first base station; and to receive the second data, the at least one processor is configured to receive the second data from the particular servicing device via a second base station.

19. The UE of claim 1, wherein the at least one processor is configured with a redundancy handling function (RHF) that is configured to generate the pair ID.

20. The UE of claim 1, wherein the at least one processor is configured to receive an apparatus policy from a network entity, and wherein, to generate the pair ID, the at least one processor is configured to cause generation or determination of the pair ID based on the apparatus policy.

21. The UE of claim 1, wherein the at least one processor is configured to:

determine a first service associated with a first PDU session determine a second service associated with a second PDU session;

compare the first service to the second service; and determine to generate a redundant PDU session of the redundant PDU sessions based on the comparison.

22. The UE of claim 1, wherein the pair ID comprises an identifier of a PDU session.

23. The UE of claim 22, wherein the pair ID further identifies a service associated with the PDU session.

24. The UE of claim 1, wherein the pair ID is PDU session ID that identifies a first PDU session associated with the first PDU session establishment message.

25. A first network entity for wireless communication, comprising:

a memory; and at least one processor coupled to the memory, wherein the at least one processor is configured to:

receive, from a second network entity, a first protocol data unit (PDU) session request message;

receive, from a third network entity, a second PDU session request message including a pair identifier (ID) generated by a user equipment (UE); and associate, a PDU session indicated by the first PDU session request message with the pair ID, wherein a value of the pair ID is an indication shared by redundant PDU sessions and configured to associate PDU sessions together as redundant.

26. The first network entity of claim 25, wherein the pair ID comprises a UE-generated pair ID and is included in a N2 session management (SM) container of the second PDU session request message, and wherein the second PDU session request message is responsive to a second PDU session establishment message which included the UE-generated pair ID.

27. The first network entity of claim 26, wherein, to associate the PDU session with the pair ID, the at least one processor is configured to modify one or more entries of a PDU table to indicate the pair ID.

28. The first network entity of claim 25, wherein the at least one processor is configured to:

receive the second PDU session request message responsive to a second PDU session establishment message; and associate a second PDU session indicated by the second PDU session request message with the pair ID, wherein, to associate the second PDU session with the pair ID, the at least one processor is configured to associate the PDU session and the second PDU session as the redundant PDU sessions.

29. A first network entity for wireless communication comprising:

a memory; and at least one processor coupled to the memory, wherein the at least one processor is configured to:

receive, from a user equipment (UE), a protocol data unit (PDU) session establishment message and a pair identifier (ID) generated by the UE; and transmit a PDU session request message for a second PDU session responsive to the PDU session establishment message, the PDU session request message including the pair ID, wherein a value of the pair ID is an indication shared by redundant PDU sessions and configured to associate the second PDU session and a prior, first PDU session together as redundant.

30. The first network entity of claim 29, wherein the at least one processor is configured to:

receive from the UE, a PDU session modification request message including remove information corresponding to the pair ID; and transmit, to a second network entity, a PDU session modification message indicating removal of the pair ID.

* * * * *